United States Patent [19]
Miltenberger

[11] 3,726,480
[45] Apr. 10, 1973

[54] THRUST VECTORING CONTROL SYSTEM FOR ROCKET NOZZLES

[75] Inventor: Louis E. Miltenberger, Ridgeley, W. Va.

[73] Assignee: The United States of America as represented by the Secretary of the Navy

[22] Filed: Feb. 24, 1971

[21] Appl. No.: 118,540

[52] U.S. Cl. ................................ 239/265.19, 60/232
[51] Int. Cl. ............................................. B63h 11/10
[58] Field of Search .................. 239/265.11, 265.19; 60/271, 232, 242

[56] References Cited

UNITED STATES PATENTS

| | | | |
|---|---|---|---|
| 3,390,899 | 7/1968 | Herbert et al. | 285/45 |
| 3,302,885 | 2/1967 | Herbert | 239/265.19 |
| 3,192,714 | 7/1965 | Hickerson | 60/230 |
| 2,814,929 | 12/1957 | Morley et al. | 60/242 |
| 2,663,140 | 12/1953 | Price | 60/242 |

Primary Examiner—Samuel Feinberg
Attorney—R. S. Sciascia, J. A. Cooke, R. J. Erickson and M. G. Raskin

[57] ABSTRACT

A system for providing a rocket powered vehicle with complete thrust vectoring capabilities including a convergent-divergent nozzle attached to a motor casing by a flexible joint member. The flexible joint member includes a laminar structure comprising a series of alternate annular elastomeric and metallic shim members. The elastomeric shim members provide omnidirectional flexible capabilities for the nozzle. Integrally connected to the nozzle is a hydraulically controlled pintle member movable along the axis of the nozzle which varies the effective cross-sectional area of the throat of the nozzle and thereby varies the magnitude of the resulting thrust.

5 Claims, 3 Drawing Figures 3,726,480

THRUST VECTORING CONTROL SYSTEM FOR ROCKET NOZZLES

BACKGROUND OF THE INVENTION

This invention relates generally to a rocket nozzle control system and more particularly to a thrust directing and thrust varying system for a rocket motor and nozzle assembly.

In the past, various methods have been employed to vary the direction and magnitude of the thrust produced by a rocket motor. For example, small vernier rockets attached to the aft end of rocket motors have been used to deflect the normal rocket stream by firing in response to appropriate signals and thereby controlling the direction of the thrust of the rocket. Additionally, direction control of the thrust has been attained through vanes attached to the sides of the rocket nozzles and, by suitable positioning thereof, deflect the rocket stream. Gimbals and flexible joints have also been employed to provide rocket nozzles with omnidirectional thrust directing capabilities.

Thrust magnitude varying apparatus are also known to exist in the prior art. Varying the effective throat area of a converging-diverging nozzles has long been known to provide an effective method for varying the resulting thrust produced by a rocket nozzle. This has been done in a variety of ways such as by providing interchangeable throat insert sections in nozzles or by restricting the cross-sectional area of the throat by inserting appropriately shaped members therein.

Problems have been encountered, however, when attempts are made to equip nozzles having thrust vectoring capabilities such, for example, as the gimballed or flexible jointed nozzled, with thrust varying apparatus and vice versa. The varying position of the omnidirectional nozzle has heretofore necessarily precluded any effective controlled variation of the thrust due to the constantly changing position of the longitudinal axis of the nozzle relative to the longitudinal axis of the rocket motor case.

SUMMARY OF THE INVENTION

Accordingly, one object of this invention is to provide a new and improved thrust directing control system for rocket powered vehicles.

Another object of the invention is the provision of a new and improved thrust magnitude varying control system for rocket motors having thrust varying capabilities.

Briefly, in accordance with one embodiment of this invention, these and other objects are attained by connecting a rocket nozzle having an integral thrust magnitude control package to a motor case using a flexible joint assembly. The thrust magnitude control package is provided in the form of a movable pintle member which varies the effective cross-sectional area of the throat by translating axially with respect thereto. The thrust varying apparatus moves integrally with the omnidirectionally mounted nozzle thereby allowing the internal and external ballistic parameters to be varied while the nozzle is in any one of the infinite possible positions allowed by the flexible joint connection.

DESCRIPTION OF THE PREFERRED EMBODIMENT

Figure 1:
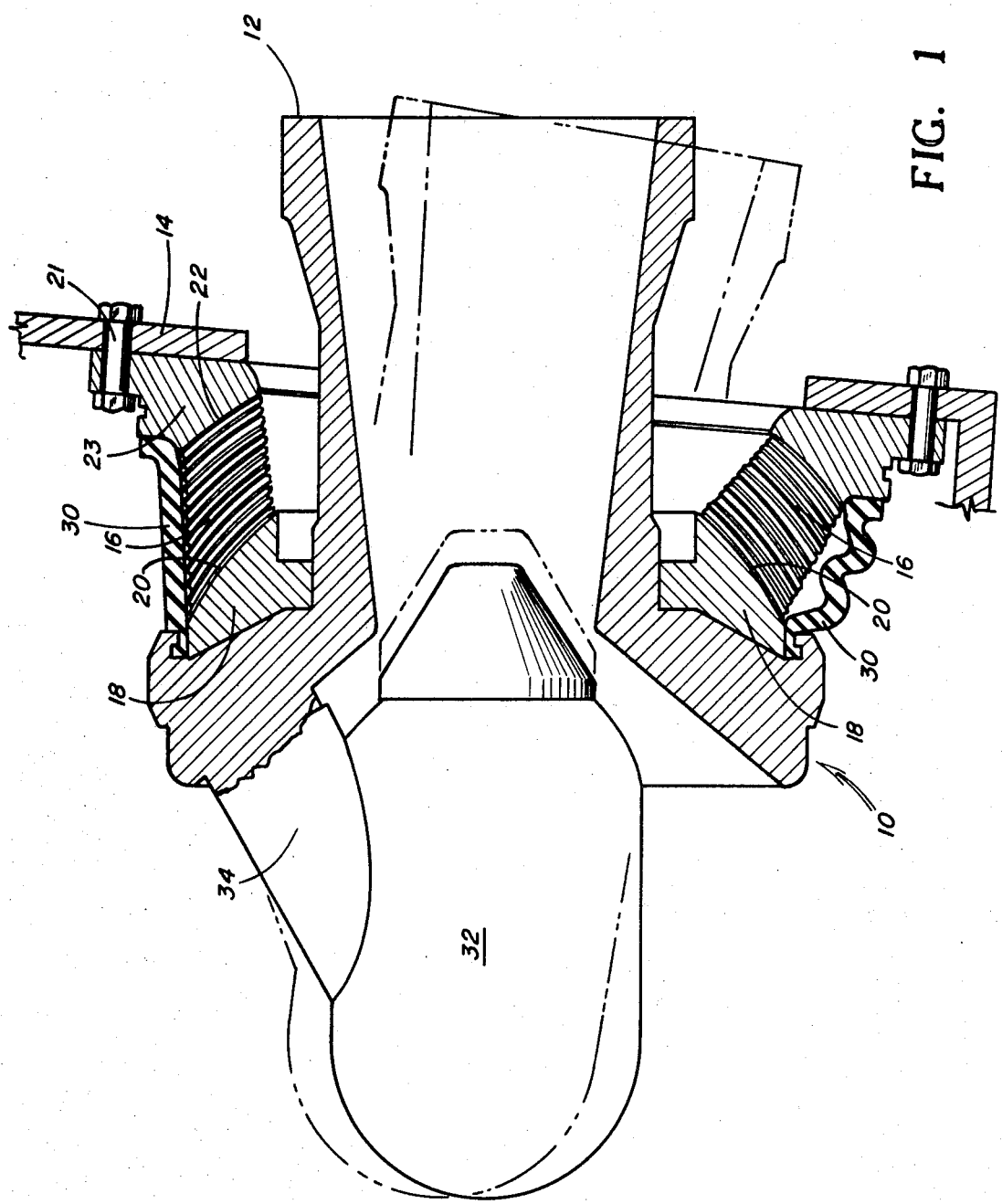
FIG. 1 is an elevational view, partly in section, of a portion of the rocket motor nozzle assembly including the flexible joint connection and throat area varying pintle apparatus of the present invention wherein the nozzle and the pintle are shown in alternative positions in phantom.
Figure 2:
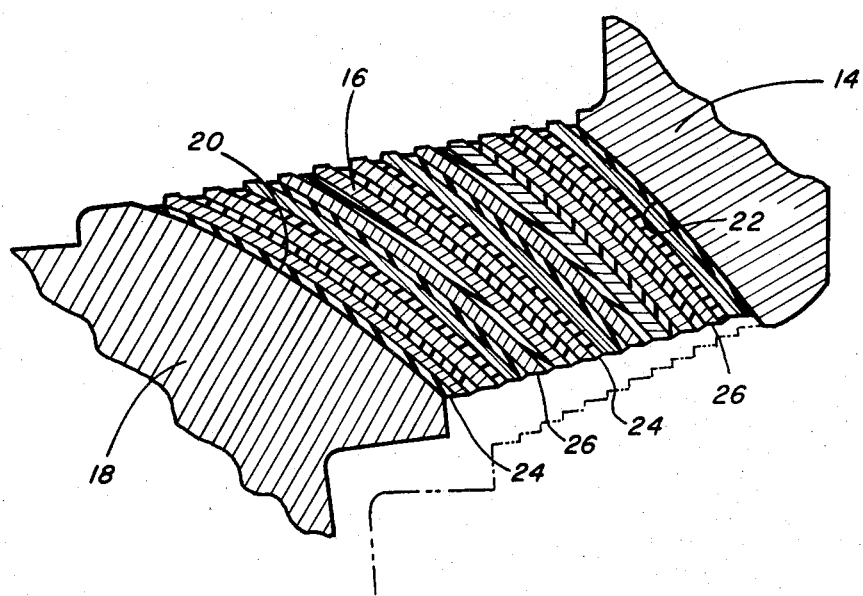
FIG. 2 is an elevational view, in section, of a detail of the flexible joint apparatus of the present invention also illustrating a flexed position thereof in phantom.

Referring now to the drawings wherein like reference characters designate identical or corresponding parts throughout the several views, and more particularly to FIG. 1 thereof, a rocket motor-nozzle assembly 10 is illustrated as including a conventional converging-diverging nozzle 12 connected to a motor case 14 through an elastometallic joint 16. Integral with and enclosing the perimeter of the nozzle 12 is an annular nozzle flange 18 having a spherically formed outer surface 20. The motor case 14 is connected by conventional means such, for example, as by bolts 21, to an annular motor casing flange 23 which has a hollowed spherical surface 22 circumferentially formed thereon. The hollowed spherical surface 22 is positioned substantially opposite to the spherical surface 20 of the nozzle attachment flange 18 in a spaced ball-socket arrangement. The respective spherical surfaces 20 and 22 of the nozzle attachment flange 18 and the motor casing flange 23 are connected by the elastometallic joint 16 including a series of alternately placed elastomeric and reinforcement metallic shims 24 and 26. Referring more particularly to FIG. 2, the reinforcement shims 26 are formed of any metallic substance such, for example, as steel and may be bonded to the alternate elastomeric shims 24 by any conventional method such, for example, as by an adhesive. Alternatively, the reinforcement shims may be molded within a low modulus rubber matrix to achieve a similar result. In the present embodiment the elastomeric shims 24 may be formed in an annular shape having a spherical cross-section of a radius approximately equal to the radii of the spherical surfaces of the annular flanges and of any low modulus elastomeric material such, for example, as natural or silicon rubber. As described hereinabove, a laminate structure is thereby formed by alternatively bonding together the elastomeric and metallic shims which are also formed having a similar spherical cross-section and an annular shape. It may be seen, therefore, that the elastometallic joint is of a generally annular configuration having opposed outer surfaces conformingly shaped to the nozzle and motor case flange spherical surfaces. The shims comprising the outer surfaces are of the elastomeric type and are respectively bonded at one end of the elastometallic joint 16 to the spherical surface 20 of the nozzle attachment flange 18 and to the spherical surface 22 of the motor case flange 23.

The low modulus elastomeric shims 24 serve as the flexible members in the joint 16 while the metallic reinforcement shims 26 serve as the load bearing members in the joint assembly.

The reinforcement shims 26 are machined with spherical surfaces as noted hereinbefore, each with successively slightly increasing radii from a common central axis. The nozzle 12, by virtue of the flexibility of the elastomeric shims 24, may be pivoted in any direction by the application of a suitable force as will be described hereinafter. The pivot point about which the thrust vectoring is achieved may be considered as the theoretical intersection of the surface radii of the reinforcement shims. This theoretical pivot point may be designed either in the subsonic or supersonic section of the nozzle joint assembly depending upon the packaging requirements and other limitations.

The number and thickness of the shims are based upon the thrust vectoring angles required for the motor and the axial pressure loads acting on the nozzle joint assembly. The elastomeric shims are the flexing components of the joint assembly as noted above and the shear strain limitations of the elastomeric material determine the maximum thrust vectoring capability per shim in the system.

Figure 3:
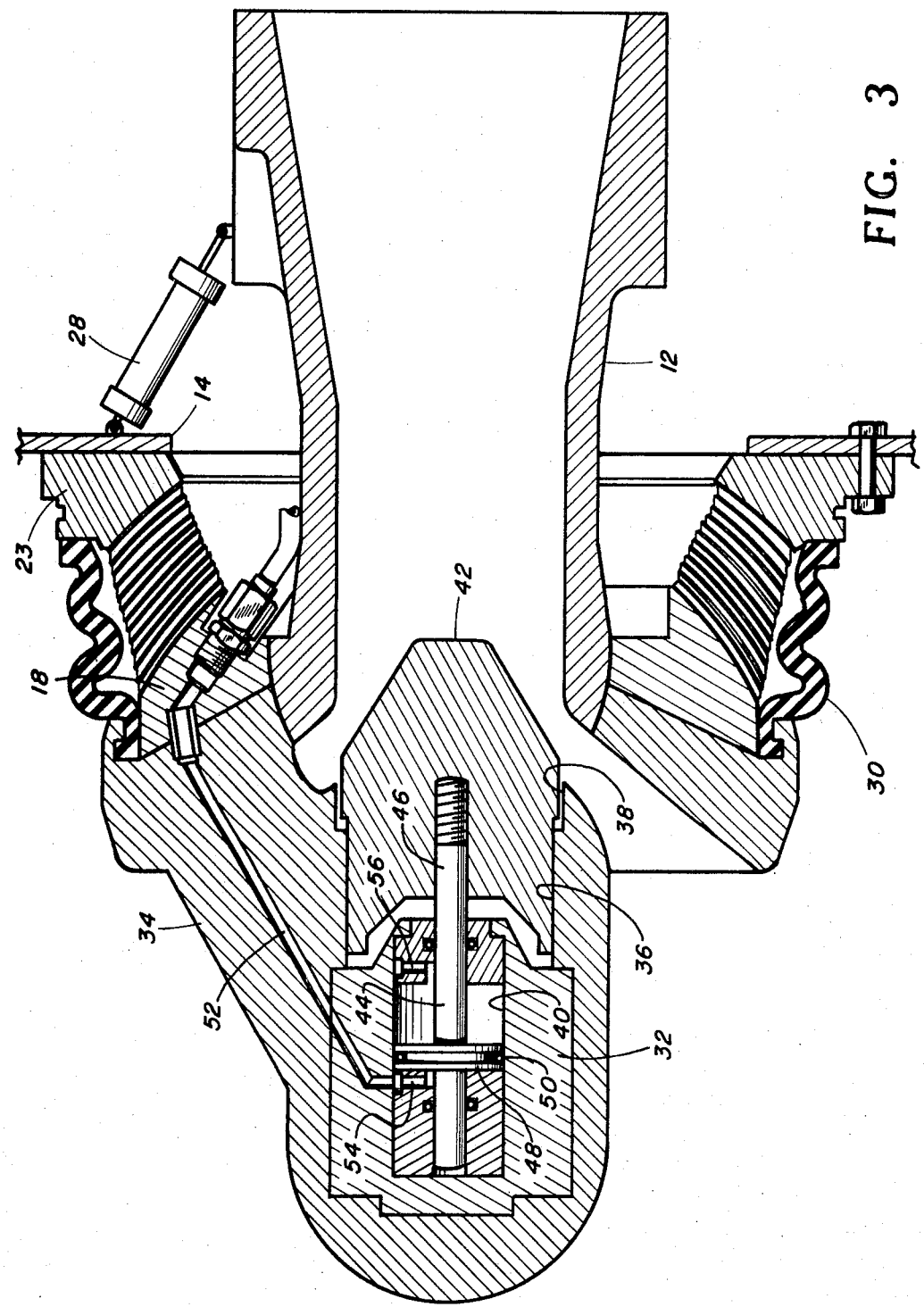
FIG. 3 is another elevational view in partial section of the rocket nozzle-motor assembly of the present invention.

To provide the force required to deflect the nozzle with respect to the motor case, pivotally mounted hydraulic actuators 28, one of which is shown in FIG. 3, of a type well known in the art extending from the motor case 14 to the nozzle 12, may be provided in quadrature around the nozzle exit. Electrical command signals are fed to the hydraulic actuators such that a given vectoring angle is achieved by extending or retracting the appropriate actuators. Thus, the nozzle is caused to pivot about a single point described hereinbefore and thereby change the direction of the thrust vector and in turn the direction of the vehicle propelled by the rocket motor.

The elastometallic joint 16 may be protected from the hot propellant gases exiting from the nozzle outlet by a rippled contoured insulation boot 30 formed from an asbestos or silica filled rubber compound and which is mechanically and/or chemically attached to the nozzle attachment flange 18 and he motor case flange 23.

Still referring to FIG. 3, the thrust magnitude varying apparatus of the present invention includes a centerbody housing 32 fixed to the nozzle 12 by means of a plurality of support struts 34 only one of which is shown in the drawing. A bore 26 is formed within housing 32 having an axial centerline colinear with the axis of nozzle 12 and includes a forward enlarged diameter portion 38 communicating with a rearward reduced diameter portion 40. Slideably positioned within the enlarged diameter portion 40 is a pintle member 42 having a generally tapered cylindrical body. A piston member 44 is Provided including an elongate shaft portion 46 axially extending through the pintle member and fastened thereto by conventional means and an enlarged piston portion 48 slideably positioned within the reduced diameter portion 40. The piston portion 48 has an O-ring 50 held within an annular groove formed therearound which communicates with the surface of reduced diameter portion 40.

One of the support struts 34 is provided with a hydraulic fluid line 52 (FIG. 3) which communicates between an external hydraulic fluid reservoir and pump (not shown) and the reduced diameter portion 40 of bore 36 behind piston portion 48 by way of inlet 54. A second support strut (not shown) similarly communicates with an external reservoir and pump but is fed into the portion of reduced diameter portion 40 ahead of piston portion 48 by way of a forward inlet 56. By selectively varying the hydraulic pressure in front of and behind the piston portion 48, the entire piston member 44 is caused to move axially within bore 36 thereby causing the pintle member 42 to move therein along the axis of the nozzle 12.

The outer surface of pintle member 42 cooperates with the inner surface of the nozzle 12 and thereby controls the effective annular nozzle throat area by rendering the gap between the fixed outer throat surface and the surface of the pintle member variable. The movable pintle member 42 and nozzle 12 are shown in two positions of operation in FIG. 1. Increased throat area, as represented by the solidly illustrated pintle member position of FIG. 1, causes a decreased chamber pressure within the nozzle while decreased throat area, as shown in phantom, results in increased chamber pressures. Nozzle 12 is shown in phantom in one of its pivoted position. The availability of modulation of chamber pressures provides the capability of changing the axial thrust of the rocket motor. A feedback control system may be provided to serve as a stabilizing loop for the pintle member. As indicated hereinabove and as shown in FIGS. 1 and 3, the centerbody housing 32 is fixedly positioned relative to the nozzle 12 by means of the support struts 34 so that the longitudinal axis of the housing and pintle 42 is coincident with the longitudinal axis of the nozzle. With this arrangement, a selected effective throat cross-sectional area, hence the rocket thrust magnitude, is not altered by pivoting of the nozzle.

In addition to the thrust modulation capability offered by the variable area nozzle concept, other advantages of he system are that a correction may be made for erosion of the nozzle throat materials and a constant operating thrust level may be maintained if desired. When attached to a rocket motor, the combined elastometallic joint and variable area nozzle system provides complete thrust management including thrust vector control and thrust magnitude control.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A thrust system for rocket powered vehicles comprising:
 a convergent-divergent nozzle having a throat of a particular cross-sectional area and a first annular flange circumscribing said nozzle;
 a rocket motor casing providing a housing for a rocket motor, said casing having a second annular flange positioned in an opposing relationship to said first annular flange;
 joint means connected to said first and second annular flanges for permitting omnidirectional pivoting of said nozzle with respect to said casing;

means for selectively pivoting said nozzle in any desired direction; and means operably disposed within said nozzle for varying said throat cross-sectional area including
a tapered body member axially disposed within said nozzle and extending from a housing;
means connecting said housing to said nozzle permitting the housing and nozzle to pivot as an integral unit; and
means disposed within said housing for selectively moving said tapered body member along the axis of said nozzle to vary the effective cross-sectional area of said throat.

2. A thrust control system as recited in claim 1 wherein:
said first and second annular flanges are formed with cooperating spherical surfaces; and
said joint means is comprised of an annular member including alternate layers of elastomeric and metallic shim members, said annular member having opposed outer surfaces comprising said elastomeric shim members conformingly shaped and bonded to said first and second annular flanges.

3. A thrust control system as recited in claim 2 wherein said tapered body moving means includes a pressure responsive piston member selectively actuated by a source of pressure external to said nozzle and connected to said tapered body member.

4. A thrust control system for rocket powered vehicles comprising:
a rocket motor casing for housing a rocket motor;
a convergent-divergent nozzle having a throat of a particular cross-sectional area;
flexible joint means connecting said rocket motor casing and said nozzle for permitting omnidirectional pivoting of said nozzle relative to said casing;
means for selectively pivoting said nozzle;
means disposed within said nozzle for selectively varying said throat cross-sectional area; and
support means connecting said throat area varying means to said nozzle to permit said throat area varying means and nozzle to pivot as an integral unit.

5. The thrust control system of claim 6 wherein:
said flexible joint means is comprised of an annular member including alternate layers of elastomeric and metallic shim members, said annular member having opposed outer surfaces comprising said elastomeric shim members conformingly shaped and bonded to said casing and said nozzle.

* * * * *